Patented Jan. 9, 1923.

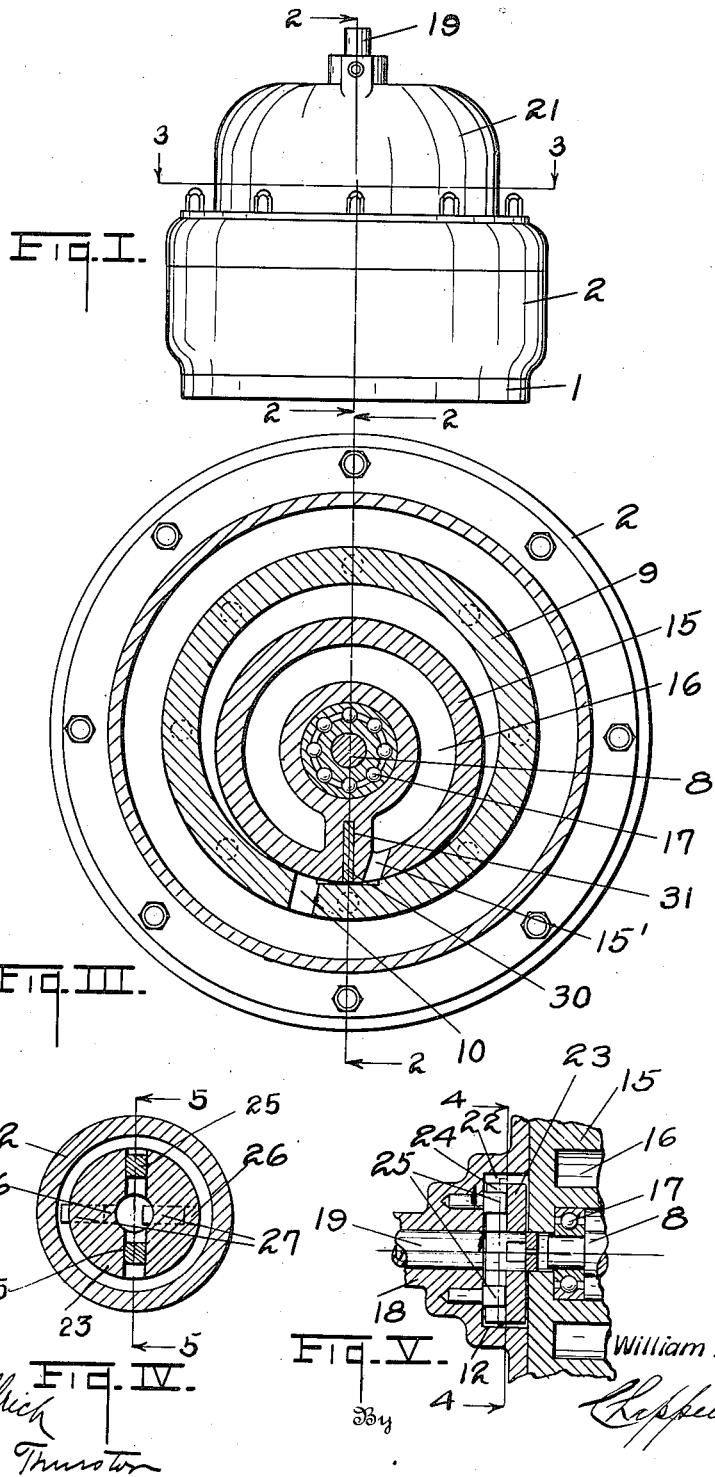

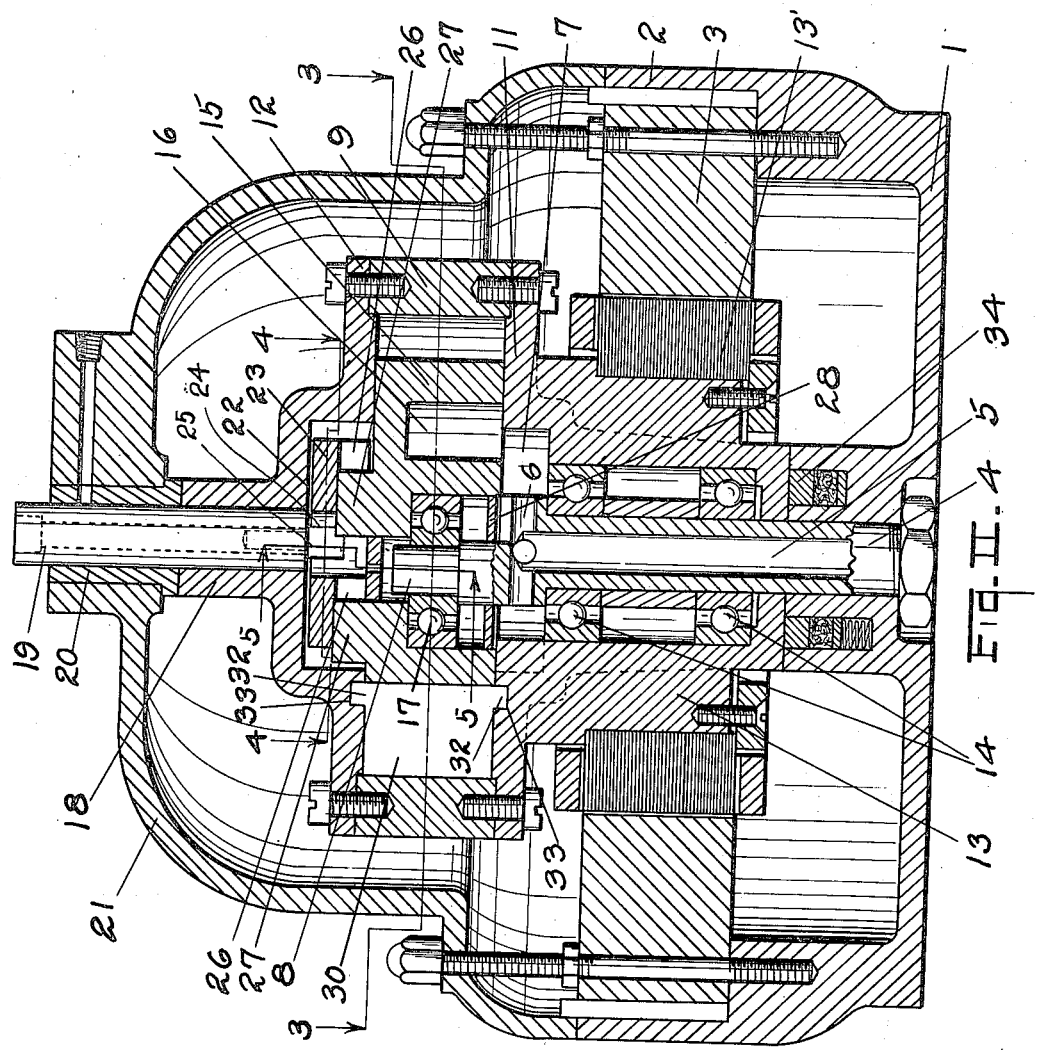

1,441,344

UNITED STATES PATENT OFFICE.

WILLIAM A. HATCHER, OF DETROIT, MICHIGAN, ASSIGNOR TO WERNICKE-HATCHER PUMP COMPANY, OF GRAND RAPIDS, MICHIGAN, A CORPORATION OF MICHIGAN.

ELECTRIC MOTOR AND ROTARY PUMP.

Application filed February 19, 1921. Serial No. 446,473.

*To all whom it may concern:*

Be it known that I, WILLIAM A. HATCHER, a citizen of the United States, residing at Detroit, county of Wayne, State of Michigan, have invented certain new and useful Improvements in Electric Motor and Rotary Pumps, of which the following is a specification.

This invention relates to an improved combination of electric motor and rotary pump.

The object of the invention is to simplify the combination of such pump and motor and to avoid connections and secure compactness and economy in construction and great efficiency in operation. The structure is especially well adapted for vacuum pumping purposes, but it can of course be made use of in any way in which such a rotary pump may be used.

Objects which relate to details and economies of construction and operation will definitely appear from the detailed description to follow.
I accomplish the objects of my invention by the devices and means described in the following specification. The invention is clearly defined and pointed out in the claims.

A structure which is a preferred embodiment of my invention is fully illustrated in the accompanying drawing, forming part of this specification, in which:

Fig. I is a side elevation view of my improved structure in vertical form.
Fig. II is an enlarged detail vertical sectional elevation view through the same taken on line 2—2 of Figs. I and III.

Fig. III is an enlarged detail sectional plan view taken on line 3—3 of Figs. I and II.

Fig. IV is a detail sectional plan view taken on irregular line 4—4 of Figs. II and V, showing details of the piston guide and associated parts, including the guideways 24 and pins 25 in cross section, the guideways 26 and projecting lugs 27 being indicated by dotted lines.

Fig. V is a vertical detail sectional elevation view taken on line 5—5 of Figs. II and IV, showing said details of the piston guide and driving means.

In the drawings the sectional views are taken looking in the direction of the little arrows at the ends of the section lines and similar numerals of reference refer to similar parts throughout the several views.

Considering the numbered parts of the drawing, 1 is the base which constitutes a portion of the outer shell of the motor, which has a shell 2 carrying the field magnet 3. The wiring of the field magnet is not shown, and the wiring of the entire motor is omitted as not necessary to an understanding of the invention.

4 is a vertical fixed journal carrying support, through which is the conduit 5. Cross openings 6 connect into the annular chamber 7 of the cylinder. The upper end of the support 4 is offset into a crank-like form at 8. 9 is the pump cylinder containing the discharge port 10 (see Fig. III). This cylinder is provided with heads 11 and 12. The head 11 is below the cylinder which stands in a vertical position. The head 11 is extended downwardly into a hub 13 which constitutes the central part of an armature of the motor. The armature 13' is disposed and supported thereon in proper relation for coacting with the field 3. Ball bearings 14 are interposed between the vertical support 4 and the hub 13.

The cylindrical piston 15 is chambered at 16 and is provided with a ball bearing 17 on the projecting crank-like end 8, and has an intake port 15' (See Fig. III). The upper head 12 has a projecting hub 18 to which is secured the hollow journal 19, the same fitting in the bushing 20 which is carried in the upper shell part 21 of the motor structure.

A recess 22 is provided in the head 12 to receive the driving and guiding member 23. This is a floating plate having radial guideways on its two faces which are at right angles to each other. The radial guideway 24 on the outside engages a pair of pins 25 (see Fig. V and dotted lines in Fig. II) that are driven into and carried by the head 12, and the guideway 26 toward the piston engages projecting lugs 27 on the face of the said piston indicated by dotted lines (Fig. II), so that when the cylinder is revolved and the head 12 is revolved, the piston is rotated in unison therewith, permitting it to maintain its contact with the said cylinder and keeping the same parallel therewith.

A radially sliding vane 30 is disposed in a recess 31 in the side of the piston (see Figs. II and III). This is provided with lateral lugs 32 which engage in slots 33 transverse to the plane thereof in the said cylinder heads. This vane is of substantially the construction of that illustrated and claimed in my concurrent patent application, Serial No. 446,469, filed Feb. 19, 1921, for Vanes for rotary pump, and is not here described in detail.

34 is a packing on the thrust surface of the base for receiving the hub of the revolving cylinder. This packing is like that illustrated and claimed in my concurrent patent application Serial No. 446,468, filed Feb. 19, 1921, for Packing means for rotary pumps or engines, and I have therefore not described the same in detail. Any suitable packing may be used in this relation.

I have not described the details by which the various parts are assembled, as they are very clear from inspection of the drawing and are of the usual construction for devices of either the rotary pump or electric motor type. Ventilation openings are provided where needed and may be omitted on small sizes. When the pump is used simply for vacuum purposes there is no conduit provided for the discharge.

Hub 18 is made hollow for lubrication and oil descends into the journal bearing of the piston. A plate 28 is provided to retain the oil in this bearing. Oil is retained in the bearing of the cylinder owing to the fact that the same is in vertical position. The bearing shell itself will thus be its own lubricant receptacle.

While I have shown this structure in the specific form which is most effective, I desire to state that the pump can be very considerably modified without departing from my invention. I have shown various modifications of this pump in concurrent patent applications. Ser. No. 446,467, filed Feb. 19, 1921, for rotary pump, Ser. No. 446,470, filed Feb. 19, 1921, for rotary pump, and Ser. No. 446,471, filed Feb. 19, 1921, for rotary pump. I have shown the form best adapted for this particular use, and desire to claim the same specifically as well as broadly, as pointed out in the appended claims.

Having thus described my invention, what I claim as new and desire to secure by Letters Patent is:

1. In a combination electric motor and rotary pump, the combination of a vertical casing, a centrally disposed journal carrying support, field magnets within the said casing, a rotary pump comprising a suitable cylinder and a cylinder head extending into a hub, bearings on the said journal support for said hub, an armature on the said hub to co-operate with the said field magnet, a cylindrical piston of less diameter than the said pump cylinder, disposed eccentrically therein and in contact with the inner surface thereof, a vane means between said cylinder and piston, a bearing eccentric to the main bearing on the said journal support for the said piston, an upper head for said cylinder having a recess therein and a suitable hollow journal at the top, a guiding plate disposed between the top head and the top side of said piston, having guides on its opposite faces disposed at right angles to each other, corresponding guide means on the said cylinder head and on the side of said piston to coact with said guiding plate, and oil passages to the said vertical journals, all coacting substantially as described for the purpose specified.

2. In a combination electric motor and rotary pump, the combination of a vertical casing, a centrally disposed journal carrying support, field magnets within the said casing, a rotary pump comprising a suitable cylinder and a cylinder head extending into a hub, bearings on the said journal support for said hub, an armature on the said hub to co-operate with the said field magnet, a cylindrical piston of less diameter than the said pump cylinder, disposed eccentrically therein and in contact with the inner surface thereof, a vane means between said cylinder and piston, a bearing eccentric to the main bearing on the said journal support for the said piston, an upper head for said cylinder having a recess therein, and a suitable hollow journal at the top, a guiding plate disposed between the top head and the top side of said piston, having guides on its opposite faces disposed at right angles to each other, and corresponding guide means on the said cylinder head and on the side of said piston to coact with said guiding plate, all coacting substantially as described for the purpose specified.

3. In a combination electric motor and rotary pump, the combination of a vertical casing, a centrally disposed journal carrying support, field magnets within the said casing, a rotary pump comprising a suitable cylinder and a cylinder head extending into a hub, bearings on the said journal support for said hub, an armature on the said hub to co-operate with the said field magnet, a cylindrical piston of less diameter than the said pump cylinder, disposed eccentrically therein and in contact with the inner surface thereof, a vane means between said cylinder and piston, a bearing eccentric to the main bearing on the said journal support for the said piston, an upper head for said cylinder having a recess therein, a guiding plate disposed between the top head and the top side of said piston, having guides on its opposite faces disposed at right angles to each other, and corresponding guide means on the said cylinder head and on the side of said piston to coact with said guiding plate, all coacting substantially as described for the purpose specified.

4. In a combination electric motor and rotary pump, the combination of a vertical casing, a centrally disposed journal carrying support, field magnets within the said casing, a rotary pump comprising a suitable cylinder and a cylinder head extending into a hub, bearings on the said journal support for said hub, an armature on the said hub to co-operate with the said field magnet, a cylindrical piston of less diameter than the said pump cylinder, disposed eccentrically therein and in contact with the inner surface thereof, a vane means between said cylinder and piston, a bearing eccentric to the main bearing on the said journal support for the said piston, and connecting and guiding means between said cylinder and piston, coacting substantially as described for the purpose specified.

5. The combination of an electric motor, a rotary pump having a rotary cylinder and a rotary piston therein, said cylinder having a head extended into a hub, an armature disposed on the said hub, and a field magnet within the casing co-operating with said armature to revolve said cylinder and piston, coacting as described for the purpose specified.

In witness whereof, I have hereunto set my hand and seal in the presence of two witnesses.

WILLIAM A. HATCHER. [L. S.]

Witnesses:
  WILLIAM F. HERZOG,
  HARRY E. WILLIAMS.